United States Patent
Winklbauer

(10) Patent No.: US 9,308,871 B2
(45) Date of Patent: Apr. 12, 2016

(54) CENTER CONSOLE FOR VEHICLES AND METHOD FOR THE PRODUCTION THEREOF

(71) Applicant: Lisa Dräxlmaier GmbH, Vilsbiburg (DE)

(72) Inventor: Manfred Winklbauer, Landshut (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 14/359,545

(22) PCT Filed: Nov. 20, 2012

(86) PCT No.: PCT/EP2012/073079
§ 371 (c)(1),
(2) Date: May 20, 2014

(87) PCT Pub. No.: WO2013/076066
PCT Pub. Date: May 30, 2013

(65) Prior Publication Data
US 2014/0284955 A1    Sep. 25, 2014

(30) Foreign Application Priority Data
Nov. 21, 2011  (DE) .......................... 10 2011 086 701

(51) Int. Cl.
*B60R 7/04* (2006.01)
*B60R 13/02* (2006.01)
*B60H 1/00* (2006.01)

(52) U.S. Cl.
CPC ............... *B60R 7/04* (2013.01); *B60H 1/0055* (2013.01); *B60R 13/0262* (2013.01); *B60R 2013/0287* (2013.01); *Y10T 29/4998* (2015.01)

(58) Field of Classification Search
CPC .... B60R 7/04; B60R 13/0262; B60H 1/0055; Y10T 29/4998
USPC ............ 296/24.34, 37.8; 297/411.21, 411.34, 297/411.32
See application file for complete search history.

(56) References Cited

U.S. PATENT DOCUMENTS 6,152,522 A  * 11/2000 Boulay et al. ................. 296/208
6,851,736 B1 * 2/2005  Klopp et al. ................. 296/37.8
(Continued)

FOREIGN PATENT DOCUMENTS

DE    10 2005 003 677 A1    7/2006
DE    10 2007 007 387 A1    8/2008
(Continued)

OTHER PUBLICATIONS

Machine Translation of JP2000272330A, printed from the EPO website, Mar. 17, 2015.*
(Continued)

*Primary Examiner* — Jason S Morrow
(74) *Attorney, Agent, or Firm* — Finnegan, Henderson, Farabow, Garrett & Dunner LLP

(57) ABSTRACT

A center console for vehicles including a first half formed of a first material and a second half formed of a second material. The first and second halves joined directly with each other. The first half includes a first side panel extending in a longitudinal direction and a first element connecting to the first side panel. The second half includes a second side panel extending in the longitudinal direction and a second element connected to the second side panel. The first element projects from the first side panel toward the second side panel. The second element projects from the second side panel toward the first side panel. The first and second elements complement one another to form a functional element.

7 Claims, 2 Drawing Sheets

(56) References Cited

U.S. PATENT DOCUMENTS

| | | | |
|---|---|---|---|
| 7,396,062 B2 * | 7/2008 | Hung et al. | 296/24.34 |
| 7,731,258 B2 * | 6/2010 | Bazinski et al. | 296/37.8 |
| 7,866,722 B2 * | 1/2011 | Shibata et al. | 296/24.34 |
| 8,528,956 B1 * | 9/2013 | Winiger et al. | 296/24.34 |
| 2007/0205623 A1 * | 9/2007 | Hung et al. | 296/24.34 |
| 2009/0174236 A1 * | 7/2009 | Lota et al. | 297/188.19 |
| 2012/0088444 A1 * | 4/2012 | Wittorf | 454/142 |

FOREIGN PATENT DOCUMENTS

| | | | |
|---|---|---|---|
| EP | 1 595 747 A1 | 11/2005 | |
| JP | 61-150241 U | 9/1986 | |
| JP | 62-076744 U | 5/1987 | |
| JP | 2000-203345 A | 7/2000 | |
| JP | 2000-272330 A | 10/2000 | |
| WO | WO 00/54952 A1 | 9/2000 | |

OTHER PUBLICATIONS

International Search Report, issued by European Patent Office, mailed Feb. 14, 2013, in International Application No. PCT/EP2012/073079 (3 pages).

* cited by examiner

CENTER CONSOLE FOR VEHICLES AND METHOD FOR THE PRODUCTION THEREOF

CROSS-REFERENCE TO RELATED APPLICATIONS

This is a U.S. National Phase of PCT/EP2012/073079, filed Nov. 20, 2012, which claims the benefit of priority to German Patent Application No. 10 2011 086 701.5, filed Nov. 21, 2011, the contents of both of which are incorporated herein by reference.

FIELD OF TECHNOLOGY

The present invention relates to center consoles for vehicles, especially automobiles, as well as a method for their manufacture.

BACKGROUND

Prior-art center consoles are usually manufactured of a uniform material, i.e., as one piece in an injection-molding process. They exhibit substantially a U-shape in the cross-section, and are demolded in a direction substantially parallel to the opposing legs of the "U." The console support manufactured in this way is provided with numerous subsequently added attachments, such as an air duct, reinforcements, trim covers, etc., which are likewise manufactured, although separately, in an injection-molding process. Bolting, clipping, welding, gluing, etc., may optionally be used in the joining process. Separate manufacturing and placement of these attachments, likewise manufactured in an injection-molding process, is time-consuming and very costly. Additionally, a certain distance must be kept between the individual components in order to compensate for tolerances of the joining processes and prevent noise during use, which increases the required installation space. Moreover, the many components will necessarily result in a double-panel design within the system and as a result, increase its weight.

Moreover, EP 1 595 74 7 A1 discloses a center console, whose console support is divided in the longitudinal direction into two halves, whereby these halves are connected via an interior part, which again is divided into two halves. Here, too, a plurality of attachments needs to be added and manufactured separately, e.g., air-duct parts, interior parts, trim covers, etc., making production very costly and time-consuming. Apart from this, a triple-panel design is present in certain partial areas, in which an interior part of a console support and a side trim panel cover one another. This has the effect of making the center console very heavy.

SUMMARY

On this background, the object of the present invention consisted in creating an economical and lightweight center console, optimally with a high degree of system integration, as well as a method for its manufacture.

This object is achieved by a center console or a method with the features recited in appended claims.

The present invention is based on two primary ideas, which in combination achieve the aforesaid object. One idea consists in partitioning the console support and/or the center console into a first and second half, which are directly joined together, i.e., contacting one another, such that multiple attachments, such as an air duct, reinforcements, mounts, connecting strips and trim covers, may be integrated on the opposing sides of the respective side panels of the halves. However, in order to integrate these attachments, the elements manufactured of the same material as the halves must protrude at least partly up to the separating plane of the two halves. With the traditionally used injection-molding process (so-called compact injection molding), this was, however, not possible due to the ratio between the thickness of the side panel and the wall thickness of the attachments to be complied with, or the side panels had to be designed with the required strength or thickness, causing the weight and cycle time to increase, or was impossible due to the lack of installation space. Thus, the second idea consists in using a thermoplastic foam injection molding process in order to manufacture the two halves as thermoplastic foam injection molding parts, whereby the wall thickness ratio may be increased considerably and the attachments constructed with sufficient wall thickness and stability up to the separating plane of the halves. By joining the two halves, a center console support and/or a center console comes about, in which multiple, previously additional components are already contained, making it less time-consuming and costly to manufacture. In addition, the weight of the center console may be reduced considerably, due to the absent multiple-panel design and the formation of a thermoplastic foam injection molding part, which obviously weighs less.

Accordingly, the present invention defines a center console for vehicles, in particular automobiles. A center console is thus a part usually extending from the front foot well of a vehicle up to in between the front seats. Center consoles usually may contain control and indicator elements, a socket for the gear-shift lever, storage bins and/or an arm rest in the area between the front seats, which arm rest also may function as the lid of a storage compartment. It is arranged in the longitudinal direction of the vehicle (the X direction) and has two side panels, which extend in the longitudinal direction of the center console and/or vehicle. This means that the first and second side panels face one another. They have internal panels facing one another, and two external panels facing away. The exteriors of the side panels may be fully or partly provided with a decor, e.g., a lining. According to the invention, the center console is constructed of a first half comprising the first side panel and a second half comprising the second side panel, whereby the two halves are directly joined together, i.e., by contacting each other. All the usual joining processes, such as a bolting, clipping, welding, gluing, etc., may optionally be used. The console halves may be joined both detachably, as well as non-detachably. In this context, the term "directly" refers to the fact that when joined, either halves are adjacent to one another and/or contact one another, at least partly, i.e., are not solely connected by a part or an element bridging the distance between these halves. The two halves of the inventive center console relate to thermoplastic foam-molded parts, whereby elements likewise manufactured of the same material in a thermoplastic foam-molding process project from either side panel toward the respective other side panel, complementing one another in the joined condition of the halves to form a functional element, e.g., an air duct, a trim cover, reinforcements, storage bins, etc. In this context, a functional element generally refers to an element providing an additional function, i.e., performing a center-console function other than forming the side panel. Furthermore, the elements of the two halves cannot provide this function individually, but only when interacting with the other element(s). As for the per-se known thermoplastic foam-molding process, reference is made to WO 00/54952, merely by way of example. As a result, especially foam-molding parts form, whose surfaces are substantially smooth and correspond to those of a compact injection molding part, whereas the cores located between the exterior surfaces contain pores resulting from the foaming process. Here, physical foaming processes may be applied, as explained in the aforementioned WO 00/54952, whereby the foaming agent is introduced externally into the plastic melt, either into the mold cavity or prior to introducing the melt, into the mold cavity. Alternatively, so-called chemical thermoplastic foam-molding processes may also be applied, whereby the foaming agent is already contained in the plastic granulate before fusing, and is only released during fusing.

It is especially preferred that in the joined condition of the halves, the elements contact their front sides facing away from the respective side panel and/or reach up to a plane, along which, the two halves of the center console are divided. The plane need not necessarily be positioned in the transverse direction centrally between the two halves, but may be moved in one or the other direction. It is also conceivable to use several plane positions within a center console, whereby the planes are arranged stepwise in the longitudinal direction.

Furthermore, the parts advantageously complement one another to form an air duct with a closed cross-section, a storage bin, inside reinforcements, which were previously manufactured separately, a socket for separate functional elements, such as gearshift levers or other indicator or control elements, or a trim cover for one end of the center console in the longitudinal direction, especially the end located at the rear relative to the vehicle direction, without the need for additional elements beyond the ones needed for joining.

Moreover, it is particularly preferred in the thermoplastic foam-molding process to provide and/or form connecting strips of the same material as the side panels in the upper surface area of the center console, which connecting strips are joined together with their facing front ends in order to connect the two halves and thus the side panels. In other words, the connecting strips are likewise divided along the aforesaid plane, and are joined in order to connect the two halves, whereby the above-mentioned joining methods may be applied here, too.

To be able to manufacture the halves with the elements formed thereon in a simple foam-molding tool, it is preferred that each half exhibits one direction of demolding extending substantially perpendicularly to the respective side panel and/or substantially parallel to the elements formed of the same material as the respective side panel. The term "substantially" should be construed such that certain draft angles, which are needed in the foam-molding process, may also be provided.

Furthermore, it may be preferred also to provide sockets for connecting and/or mounting the arm rest at the sides of the two side panels facing inward. As the side panels and/or center console is divided in the longitudinal direction, is possible to install the arm rest in these mounts during joining, thereby making it possible to place the mounting further downward away from the top surface, which causes the forces introduced into the support to be decreased. The mounting may thereby extend with a closed, e.g., circular cross-section, likewise in the direction of demolding, and/or in the same direction as the other elements, and is preferably also formed of the same material.

Moreover, it is also conceivable to form reinforcing ribs at the side panels and of the same material, which may additionally reinforce weak sections, and extend in the same direction as the elements or the mounting or the connecting strips, i.e., in or along the direction of demolding of the respective side panel.

What's more, the state-of-the-art center console, in which the side panels are combined in one component of the same material, assumes a three-dimensional shape, whose surface cannot be unfolded or mapped without distortions. By implication, this means that the surface cannot be lined with a material in a distortion- and interference-free way, if the material originally exists in an even surface, which is the case, e.g., for leathers, veneers, and the like. Due to the two-part design of the present center console, in which the opposing side panels are designed as separately shaped components, which are subsequently joined to the center console, it is however possible to form the external contour of the center console at least partly, such that it assumes a three-dimensional shape, whose surface may be unfolded or mapped without distortions. Thus, it is possible to line this partial surface formed in this directly (immediately) with a material, which is originally present in an even surface, such as, e.g., leather, veneers, textiles, etc.

Beyond that, it is conceivable to line at least one, preferably both halves in a partial area with a decor, independently of the above aspect, as well. The decor is preferably applied directly to cover the partial area of the corresponding half, especially a partial area of the side panel. Thus far, such decor layers were applied initially to cover a separate support, which in turn had to be joined with the console support, e.g., the side panels. For different decor variants, e.g., leather, veneer from wood or stone, etc., different supports had to be made available. Alternatively, the console supports, i.e., their side panels may be formed differently, in order to adjust for the different strengths of the different decor materials. This problem can likewise be resolved, due to the two-part design of the center console of the present invention with the two halves. This is because the decor material may be applied to cover the halves. A shoulder is preferably provided in the partial area. If no lining is to be applied, but merely paint work is provided, the shoulders function as shadow gaps and/or rounded edges, and are visible. If a lining, e.g., in the form of leather, is applied in this partial area, it is flush with the surrounding component surfaces, whereby the strength is adjusted by the shoulder. The shade gap disappears. The lining in the area of the shoulder may be applied turned over to form a lining and likewise exhibit a decorative seam.

Beside the above-mentioned center console, the present invention also proposes a method for its production. For this purpose, the first and second halves are manufactured in a thermoplastic foam molding process, as explained above, and after their manufacture connected and/or joined with one another in a further step by known joining processes, whereby advantageously this joining occurs directly, as described above, and the elements of the first and second side panels complement one another in the joined condition to form a functional element, as mentioned above.

In addition, it may be advantageous for the afore-mentioned reasons to carry out the manufacture of the first and second halves such that during the introduction of the material, i.e., the plastic and/or the foaming agent, into the form cavity, a form cavity is increased during the foam-molding process. This variant leads additionally to a more rigid component.

Further advantages and features of the present invention, which are implementable separately or in combination with one or more of the above features, provided they do not contradict one another, are found in the following description of preferred embodiments.

BRIEF DESCRIPTION OF THE DRAWINGS

FIG. 4b is a partial cross section of the center console in FIG. 4a.

DESCRIPTION OF THE EMBODIMENTS

Figure 1:
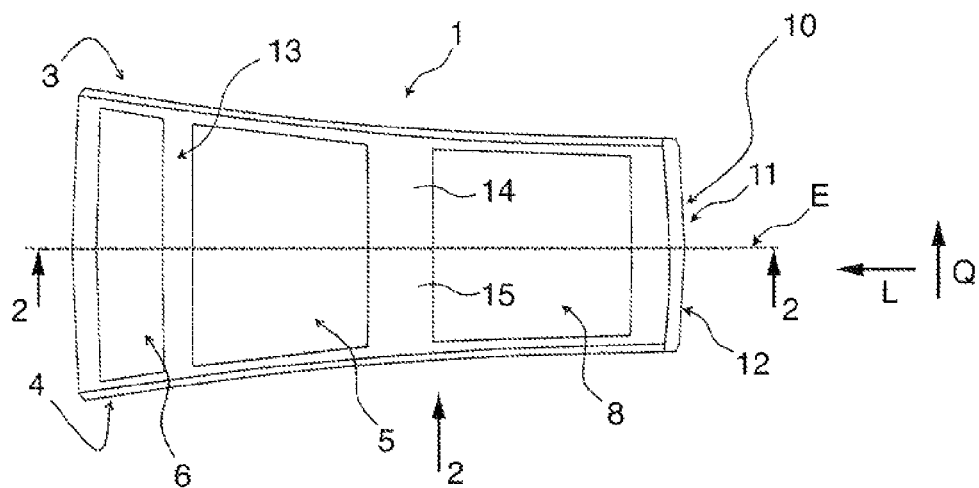
FIG. 1 is a plan view on a center console according to the present invention.

FIG. 1 is a top view of a center console according to an embodiment of the present invention. It is composed of a first half 1 and a second half 2. The first half 1 has a first side panel 3, which extends in a slightly concavely curved fashion in the longitudinal direction L, as can be seen in FIG. 1.

The second half 2 likewise has a side panel 4, which faces side panel 3 and likewise extends in a curved fashion in the opposite direction along the longitudinal direction L.

As can also be seen in FIG. 1, the first and second halves 1, 2 are divided along a separating plane E. As for the representation in FIG. 1, the first half 1 is a mirror symmetry plane of the second half 2 with regard to plane E.

Figure 2:
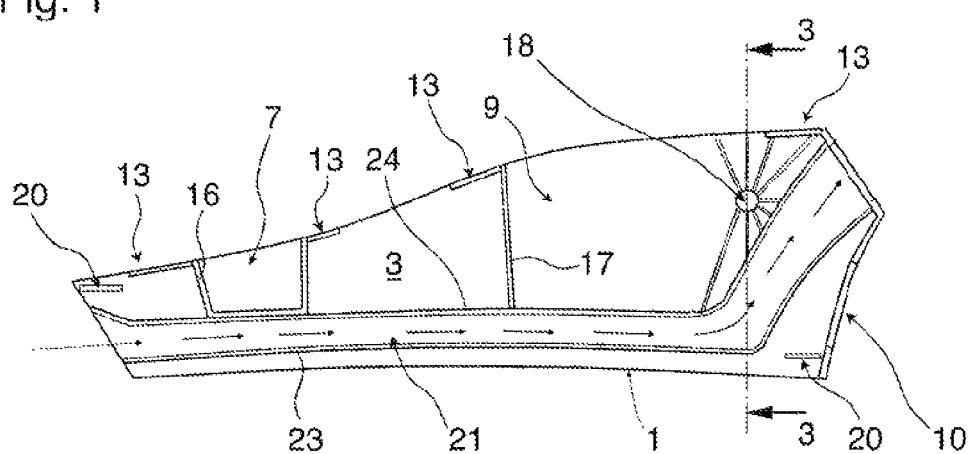
FIG. 2 is a longitudinal section along the two halves of the center console in FIG. 1.

It can furthermore be seen that the center console in FIG. 1 has a recess 5, which in the installed condition receives the gearshift lever, including the relevant covers. Also, before recess 5, a recess 6 is provided in the longitudinal direction of the vehicle, providing access to a storage bin 7 (FIG. 2). A further recess 8 is likewise provided in the area behind recess 5 in the longitudinal direction of the vehicle, providing access to a storage compartment 9 (FIG. 2), which in its complete condition, is locked by an arm, not shown.

It can furthermore be seen in FIG. 2 that the rear area of the center console in the longitudinal direction of the vehicle has a trim cover 10. The trim cover 10 consists of two elements 11, 12. The elements 11 and 12 extend substantially transversely to the longitudinal direction L and/or from their respective side panels 3, 4 toward the opposing side panels 4, 3 and are joined and/or contact one another in the area of the separation plane E. In the shown embodiment, both elements 11, 12 are made of the same material as their respective side panels 3, 4.

In addition, several (here four) connecting strips 13 are provided, each likewise composed of two elements 14, 15. Likewise, the elements 14, 15 thereby extend transversely to the longitudinal direction L and/or the separation plane E and/or from their respective side panels 3, 4 toward the opposite side panels 4, 3. These elements 14, 15 are joined in the area of the separation plane E, as well.

Furthermore, as shown in FIG. 2, additional elements are attached at the corresponding halves 1, 2, whereby only half 1 is depicted in FIG. 2. These elements relate to, e.g., the walls 16, which form storage bin 7. They likewise extend substantially in the transverse direction Q and and/or from a side panel 3 toward the respective opposite side panel 4 Similarly, the aforesaid walls 16 are also made of the same material as side panel 4, whereby the walls 16 of the two side panels 3, 4 are correspondingly joined together at the separation plane E in order to form storage bin 7. The same situation applies to wall 17 for the formation of storage compartment 9.

Figure 3:
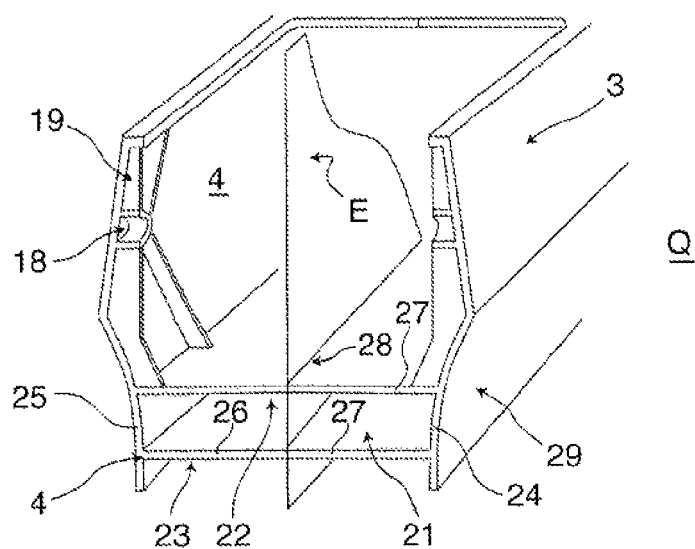
FIG. 3 is a cross section along the line 3-3 in FIG. 2.

Further, in order receive the tiltable arm rest in order to lock the opening 8 of both halves 1, 2, the mounting 18 is formed, as can be seen in FIGS. 2 and 3. These mountings 18 have a closed form, here a circular shape, in the cross-section, and likewise extend in the transverse direction, whereby the transverse direction, as explained below, also corresponds to the direction of demolding. Furthermore, in order to reinforce the mounting areas 18, reinforcement ribs 19 made of the same material as the corresponding halves 1 and 2 and/or their side panels 3, 4 are arranged and likewise protrude from the inside of the respective side panels 3, 4 in the transverse direction.

However, mounting 18 and reinforcing ribs 19 do not protrude up to the separation plane E.

In addition, as shown in FIG. 2, attachment preparations 20 for attaching the center console on the vehicle carcass may be formed in the same material as the halves.

As further system integration, it has proven especially advantageous to integrate an air duct 21 (FIGS. 2 and 3). This is composed of an upper wall 22 and a lower wall 23, as well as respective opposite side panels 24, 25. As best shown in FIG. 3, the side panels 24, 25 are formed by sections of the side panels 3, 4. The upper and lower walls 22, 23, similar to the elements 11, 12 and 14, 15, consist of two elements 26, 27, each formed of the same materials as a respective side panel 4, 3 and extend in the transverse direction Q from an internal side of the respective side panel 4, 3 toward the respective other opposing side panel 3, 4. The respective elements 26, 27 are joined, e.g., along a joint line 28 in a welding process. However, alternate joining processes may optionally be used, as well. Thus, an air duct 21 may be created, which will be fully operational without additional separate elements.

Consequently, the center console, as described in their present condition, may be formed of solely two halves, each manufactured in a foam-molding process, and only these two halves need to be joined. The only additional part may be the arm rest, which when the two halves 1, 2 are joined, may be received in the mountings 18. This produces the additional advantage that the mounting 18 may be placed further below, which caused a decrease of the forces introduced into the carrier, as the distance of the mounting 18 to the supporting area of the center console is reduced.

Formation of the air duct 21 and/or its walls 22, 23, the connecting strips 13, the walls 16 of the storage bin 7, the wall 17 of the storage compartment 9, as well as the trim cover 10 is made possible by manufacturing the two halves 1, 2 in a thermoplastic foam-molding process according to the invention, e.g., similar to the one described in WO 00/54952. However, so-called chemical thermoplastic foam-molding processes are also conceivable. The halves of 1, 2 are thereby divided along the plane E in the longitudinal direction L, and the direction of demolding is chosen along the transverse direction Q. This makes it possible, on the one hand, to form the ribs 19, the mounting 18, the elements 26, 27, 11, 12, 14, 15, and the attachment preparations 20 without the use of slides in the molding tool. Conversely, this allows for undercuts, e.g., concave surface shapes in the area of the side panels, e.g., as depicted in FIG. 3 at 29. By using the thermoplastic foam-molding process, the ratios between the wall thicknesses of side panels 3, 4 and those of the attached elements 11, 12, 14, 15, 16, 17, 18, 19, 20, 26, 27, especially the elements extending up to the separation plane E, may be set as a ratio of, e.g., 1:1 or greater, which is not feasible with conventional compact injection-molding processes. Due to the longitudinal division along the plane E and the use of the foam-molding process, it becomes possible to integrate a plurality of elements and form these of the same materials as the two halves. In addition, by using the foam molding process, a lighter component is realized. This is further supported, in that the integration often makes a double-paneled design redundant.

Furthermore, the area of the side panels 3, 4 is where the greatest use of material is envisioned. Because in the foam-molding process, when the material, especially the melt, and/or the foaming agent are introduced into the mold cavity, the mold halves are opened relative to one another in the direction of demolding, i.e., the form cavity is increased, it becomes possible to further increase foaming in the core area, whereby the pores are enlarged and a further rigidity advantage may be achieved. This advantage is especially enhanced, as the division of the halves occurs in the longitudinal direction and thus the stroke, especially in the area of the side panels, causes an increase in the pores. Since the side panels are where most of the material for the center console is used, an even greater weight optimization may be achieved. Thus, the inventive solution offers a high degree of system integration and hence fewer components and more stability, less investments in tools and installation fixtures, reduced installation times, and a lighter overall system with improved utilization of the installation space. Finally, fewer installation aids are needed, as merely two halves 1, 2 will be joined, and the freedom of design is greater in the side panel area, as the direction of demolding is situated more conveniently, and thus also allowing for concave surface shapes.

Moreover, it is possible to cover a partial area in advance, although preferably after the two halves have been joined. The present invention makes this possible in an advantageous fashion, as explained below with reference to FIGS. 4*a* and 4*b*.

Figure 4A:
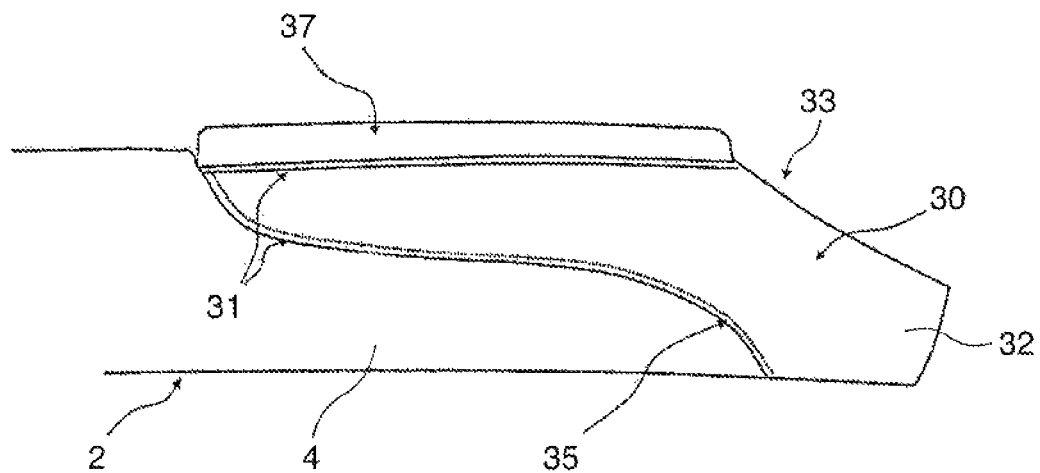
FIG. 4a is a side view of a center console of the present invention with a covered partial area.

FIG. 4*a* is a side view of a center console according to a second embodiment of the present invention. In FIG. 4*a*, only one, i.e., the second half 2 with the respective side panel 4 is shown. Because half 2 is manufactured separately and with a direction of demolding in the transverse direction Q, as described above, it is possible to limit an area 30 to be covered by means of shoulders 31. A lining 32, e.g., of leather, may extend in a front area 33 of the center console over the joint location between the two halves, and possibly cover it.

Figure 4B:
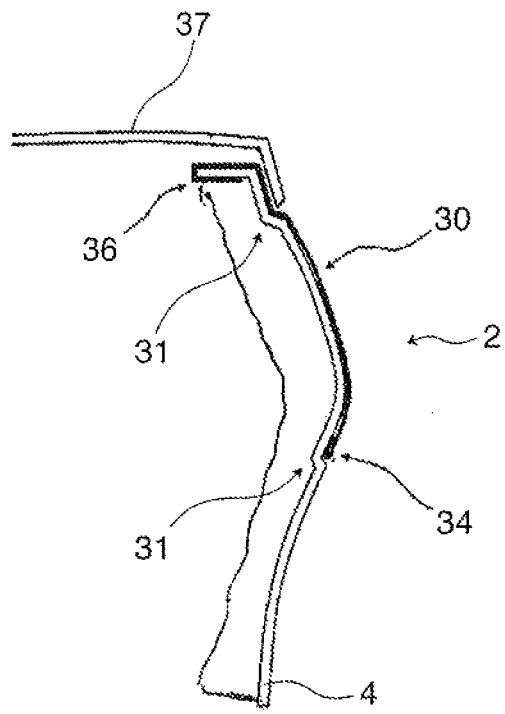

As is best shown in FIG. 4*b*, the lower shoulder 31 of FIG. 4*a* is intended to adjust the strength of the lining material 30, such that in the area of the side panel 4, a flush surface between the lining material 30 and the remaining area of side panel 4 results. In the area of this shoulder 31, the lining material 30 is preferably folded and fastened by a seam (see FIG. 4*a*), which is later visible as a decorative seam 35, as an edge fold. The upper shoulder 31 of FIGS. 4*a* and 4*b* are intended to provide sufficient installation space for the lining material 30, whereby the lining material 30 at the upper end of half 2 is folded around a strip 36 protruding in the cross direction. Furthermore, this edge-folding area may be covered by a trim cover 37.

If no lining and/or decorative material 30 is applied on the partial area, then this partial area may, e.g., be painted, whereby the shoulders 31 remain visible as a rounded edge and/or shadow gap.

The invention claimed is:

1. A center console for vehicles, comprising:
   a first half including:
      a first side panel formed of a first material and extending in a longitudinal direction;
      a first element formed of the first material connected to the first side panel; and
      a first connection made of the first material and protruding from the first side panel toward the second side panel;
   a second half joined directly with the first half, the second half including:
      a second side panel formed of a second material and extending in the longitudinal direction;
      a second element formed of the second material and connected to the second side panel: and
      a second connection made of the second material and protruding from the second side panel toward the first side panel; and
   an arm rest movably mounted in the first and second connections, wherein:
      the first element projects from the first side panel toward the second side panel,
      the second element projects from the second side panel toward the first side panel, and
      the first and second elements complement one another to form a functional element.

2. The center console according to claim 1, wherein:
   the first element has a first front end facing away from the first side panel,
   the second element has a second front end facing away from the second panel, and
   he first and second front ends contact each other.

3. The center console according to claim 1, wherein:
   the first half includes a plurality of first elements projecting from the first side panel toward the second side panel,
   the second half includes a plurality of second elements projecting from the second side panel toward the first side panel, and
   each of the first elements complements one of the second elements, such that the first and second elements and the first and second side panels form at least one of an air duct with a closed cross-section, internal reinforcements, a storage compartment, a socket configured to receive separate functional elements, or a trim cover configured to cover one end of the center console in the longitudinal direction.

4. The center console according to claim 1, further comprising:
   connecting strips connecting the side panels in an area of the upper surface of the center console at a distance,
   wherein the connecting strips are partly formed of the first material and partly of the second material.

5. The center console according to claim 1, further comprising:
   a decor directly provided on at least one partial area of one of the first and second side panels facing away from another one of the first and second side panels.

6. The center console according to claim 5, wherein the partial area is limited by at least one shoulder in the one of the side panels.

7. A method for manufacturing a center console for vehicles comprising:
   manufacturing, in a first thermoplastic foam-molding process using a first material, a first half including:
      a first side panel; and
      a first element protruding from the first side panel;
   manufacturing, in a second thermoplastic foam-molding process using a second material, a second half including:
      a second side panel;
      a second element protruding from the second side panel;
   joining the first and second halves, such that:
      the first and second side panels face each other and extend along a longitudinal direction of the center console, and
      the first and second elements complement one another to form a functional element,
   wherein:
      manufacturing the first half includes:
         introducing the first material into a first form cavity; and
         increasing the first form cavity while introducing the first material into the first form cavity,
      manufacturing the second half includes:
         introducing the second material into a second form cavity; and
         increasing the second form cavity while introducing the second material into the second form cavity.

* * * * *